United States Patent [19]

Ishiwatari et al.

[11] 4,210,024

[45] Jul. 1, 1980

[54] TEMPERATURE MEASUREMENT APPARATUS

[75] Inventors: Hiromasa Ishiwatari, Ikoma; Yoshinori Yamada, Kadoma, both of Japan

[73] Assignee: Matsushita Electric Industrial Co., Ltd., Kadoma, Japan

[21] Appl. No.: 964,520

[22] Filed: Nov. 29, 1978

[30] Foreign Application Priority Data

Dec. 5, 1977 [JP] Japan .............................. 52/146295

[51] Int. Cl.² .......................................... G01K 1/20
[52] U.S. Cl. .................................... 73/362.5; 73/1 F; 73/362 AR
[58] Field of Search ............... 73/362.5, 1 F, 362 AR, 73/708; 364/557

[56] References Cited

U.S. PATENT DOCUMENTS

| 3,564,420 | 2/1971 | Webb | 73/1 F |
|---|---|---|---|
| 3,657,926 | 4/1972 | Munson et al. | 73/1 F |
| 4,041,382 | 8/1977 | Washburn | 73/1 F |
| 4,125,023 | 11/1978 | Amemiya et al. | 73/362 AR |

Primary Examiner—Donald O. Woodiel
Attorney, Agent, or Firm—Cushman, Darby & Cushman

[57] ABSTRACT

A temperature measurement apparatus comprising a temperature sensitive device such as thermistor and a reference resistor of small temperature coefficient of resistance, which are alternatively connected to an electric circuit which produces an output signal responding to change of resistance, and the apparatus comprises a memory which memorizes a reference output signal by a reference resistor at a predetermined reference environmental temperature and a reference voltage of a power source, and a calibration is made to a measured temperature value by use of said memorized reference output signal.

3 Claims, 4 Drawing Figures

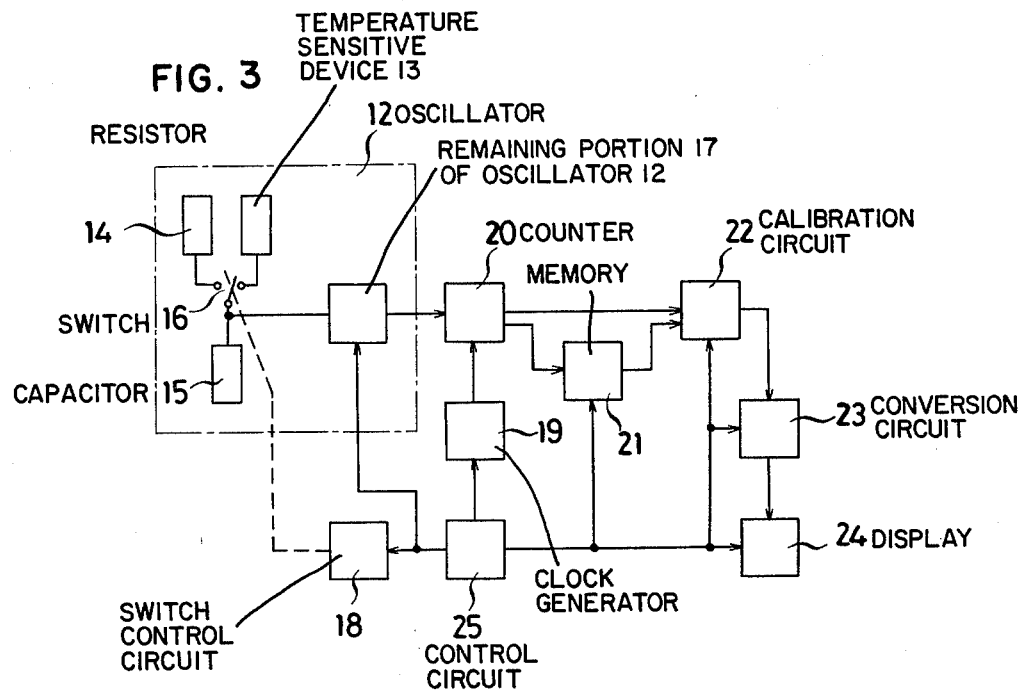
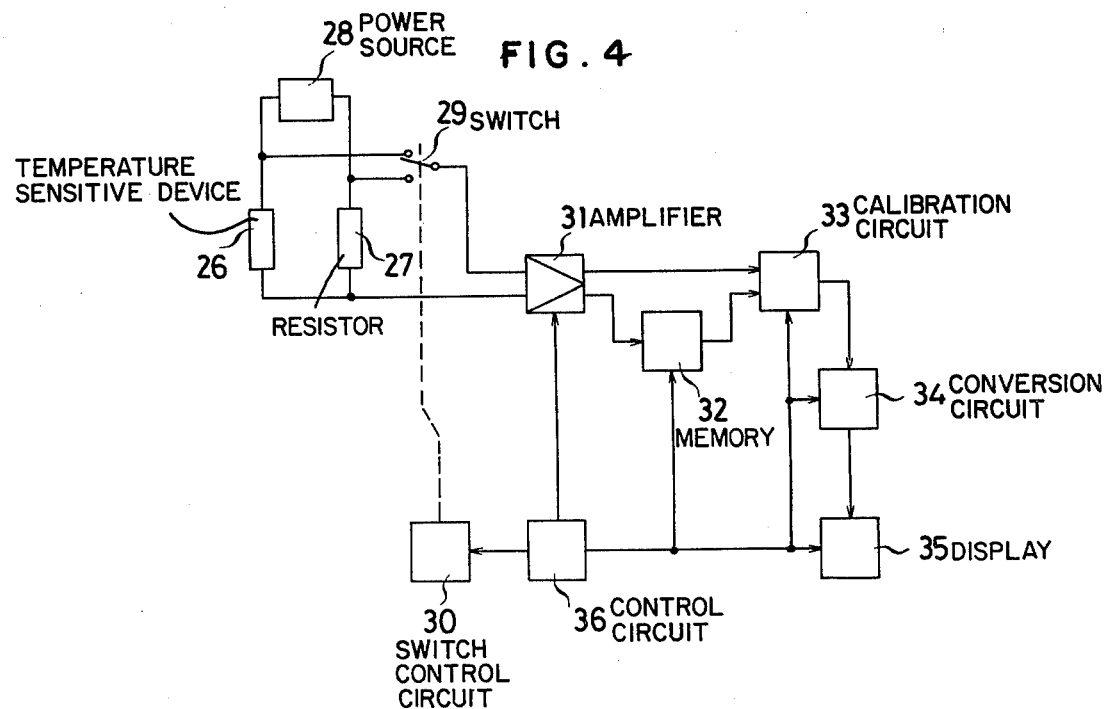

TEMPERATURE MEASUREMENT APPARATUS

BACKGROUND OF THE INVENTION

1. Field of Technology

This invention relates to a temperature measurement apparatus using a temperature sensitive device such as a thermistor, or a temperature measurement resistor. The invention is aimed at suppressing variations or errors of measured temperature values arising from temperature variation surrounding the circuit devices of the termperature measurement apparatus and power supply voltage variation.

2. Prior Arts

FIG. 1 shows one example of conventional temperature measurement apparatus, which comprises a bridge circuit 1 including a temperature sensitive device, a power source 2, an amplifier 3 and a display apparatus 4 of measuring temperature values such as a meter or a numeral display apparatus. It is necessary for the temperature measurement apparatus to select resistor devices having preferably small temperature coefficient except the termperature sensitive device in the bridge circuit 1 and it is also necessary to constitute the temperature measurement apparatus in such a manner that the power source 2 and the amplifier 3 are less influenced by temperature variation. There are several ways to countermeasure the above intervention for the temperature measurement (i) the power source 2 and the amplifier 3 are specially devised in their circuit configuration, (ii) circuit elements are selected from such transistors, ICs, resistors and capacitors, etc. that have favourable temperature characteristics, and (iii) circuits and devices are suitably used to calibrate and/or compensate the temperature variation. The abovementioned countermeasures give rise to make the temperature measurement apparatus cost much.

Another example of a conventional temperature measurement apparatus is shown in FIG. 2. The apparatus comprises an oscillator circuit 5 which includes a time constant circuit 6 consisting of at least a resistor and a capacitor and determining an oscillation frequency or a width of oscillation pulses. In the circuit 6, one resistor is a temperature sensitive device used for a temperature measurement probe. The block 7 designates the remaining part of the oscillator circuit 5 excluding the time constant circuit 6. The apparatus also comprises a reference frequency oscillator 8 which is usually an oscillator making use of a crystal oscillator and is for measurement of the frequency of the oscillator circuit 5 or the width of the oscillation pulses thereof, a frequency counter 9 which counts number of output pulses of the oscillator circuit 5 during one cycle of output pulses of the reference frequency oscillator 8, a conversion circuit 10 which converts a counted number of the frequency counter 9 into a value scaled in temperature, and a display apparatus 11 for displaying a temperature value.

In the temperature measurement apparatus of FIG. 2, temperature is measured by measuring variation of the oscillator frequency of the oscillator circuit 5 by utilizing a certain reference frequency. The oscillation frequency of the oscillator circuit 5 varies when temperature around the temperature sensitive device varies and this frequency variation is detected with respect to the reference frequency. To diminish an error-inducing effect on the electric parts due to variation of the environmental temperature around the temperature measurement apparatus, it is necessary that the oscillation frequency of the oscillator circuit 5 is not affected by the environmental temperature and besides that the reference frequency of the reference oscillator 8 is stable with respect to the variation of the environmental temperature. This means that temperature dependency of the utilized devices except the temperature sensitive device in the oscillator circuit 5 must be small and the circuit configuration must be devised to achieve such purpose. This requirement leads to the use of a crystal oscillator, whose temperature coefficient of the oscillation frequency is extremely small, for the reference oscillator 8.

There is also a possibility that the temperature measurement is accompanied with errors arising from the variation of the power source voltage. It is not so significantly problematic for the stabilization of the power source voltage when commercial electricity is available, although it costs much to produce a stabilized voltage. This contrasts to a case where a battery power source is used thereby necessitating batteries of high voltage in order to stabilize the voltage thereby, and where power consumption increases for the voltage stabilization causing shortened battery life.

SUMMARY OF THE INVENTION

The present invention provides a temperature measurement apparatus which temperature precisely and without a reference frequency oscillator circuit making use of a crystal oscillator, a stabilized battery voltage source, special circuit elements of small temperature coefficient, or a special amplifier having little thermal drift.

BRIEF EXPLANATION OF THE DRAWING

FIG. 3 shows a block diagram of a temperature measurement apparatus according to one embodiment of the present invention.

FIG. 4 shows a block diagram of a temperature measurement apparatus according to other embodiment of the present invention.

DETAILED DESCRIPTION OF THE PREFERRED EMBODIMENT

Figure 1:
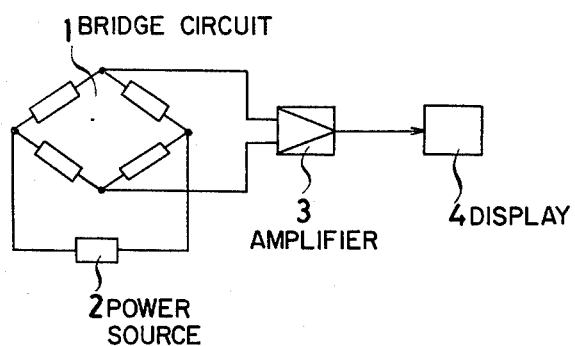
FIG. 1 shows a block diagram of a conventional bridge-type temperature measurement apparatus.
Figure 2:
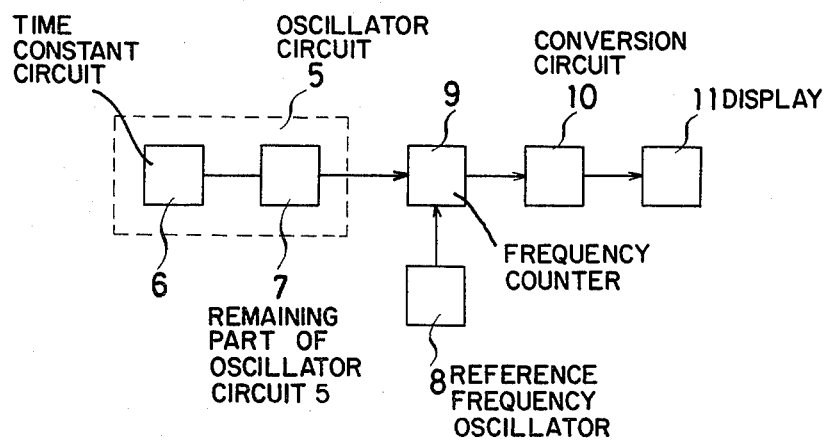
FIG. 2 shows a block diagram of a conventional temperature measurement apparatus of a pulse width modulation type or a frequency modulation type.

To fulfill the requirement for a precise temperature measurement, a temperature measurement apparatus according to the present invention is so designed that measurement errors during the temperature measurement caused by the environmental temperature and power source voltage are detected at the time when the temperature measurement apparatus is turned on or at every certain time interval, and that the variation equivalent to the errors is memorized and calibration for measured temperature values is made by use of the memorized values. This means that the measurement errors, which arise from the temperature variation affecting the utilized circuit elements and an employed circuit configuration, are removed by the abovementioned calibration. Measurement accuracy is accordingly improved and production costs of the measurement apparatus become less than the conventional ones. Therefore, according to the present invention, it is not necessary that the utilized circuit elements and the employed circuit configuration should have particularly small dependency on the environmental temperature variation and the power source voltage variation.

The temperature measurement apparatus according to the present invention is also so constituted that the variation measurement, memorizing thereof, the temperature measurement and the calibration thereof are automatically controlled and sequentially carried out.

When the temperature measurement apparatus is turned on, it is made in a check mode operation. First, an effect of variations caused by the environmental temperature and a state of the power source voltage at the moment are measured and digitally memorized. The apparatus is then set to a measurement mode operation and a temperature at a desired point is measured. The measured temperature value is calibrated by the already memorized variation value due to the environmental temperature and power source, and a calibrated result is displayed or recorded. The abovementioned overall operation is carried out once, when the temperature measurement needs to be done and it finishes in a short time, for example a measurement for the body temperature. The abovementioned example of overall operation is summarized: Power on→check mode operation→measurement mode operation→power off.

When the temperature measurement is to be made continuously and for a long time, in which case the environmental temperature may vary, satisfactory results are obtainable by intermittently setting the temperature measurement apparatus in the check mode operation at appropriate time intervals. Time scale needed for the check mode operation can be made so short as 10–100 m sec., and therefore this means that the temperature measurement can be made without substantial interruption, nor is there inconvenience for displaying the measured values almost continuously, if a display apparatus is capable of holding and displaying the measured value just before a switching of the temperature measurement apparatus into the check mode operation for the interval of the measurement mode operation.

Embodiments of the present invention are elucidated referring to the accompanying drawings as follows:

FIG. 3 shows a block diagram of a temperature measurement apparatus as one embodiment of the present invention. A measurement method is based on a system configuration where the measured value is resultantly obtained by digital processing.

The measurement apparatus of FIG. 3 comprises an oscillator 12, e.g. a monostable multivibrator, a temperature sensitive device 13 such as a thermistor, a temperature measurement resistor, or the like, a reference resistor 14 of a small temperature coefficient of resistance, a capacitor 15 to form a time constant circuit with the device 13 or the resistor 14, a switch 16, a block 17 designating the remaining portion of the oscillator 12 excluding the time constant circuit, a switch control circuit 18 to control the switch 16, a clock generator 19 to generate a reference frequency, a counter 20, a memory 21, a calibration circuit 22, a conversion circuit 23, a display or a record apparatus 24, and a control circuit 25.

The switch 16 is used to switch over between two devices 14 and 13 in accordance with the check mode and measurement mode operations, respectively. The counter 20 counts number of pulses coming from the oscillator 12 during one cycle of clock pulses given from the clock generator 19. The calibration circuit 22 is to calibrate temperature dependent variation for measurement values of the counter 20 by utilizing an output of the memory circuit 21.

The conversion circuit 23 converts the counted number of the pulses of the output of the calibration circuit 22 into values scaled in temperature, and the converted values are displayed or recorded by the display or record apparatus 24. The control circuit 25 sequentially controls the circuits of the temperature measurement apparatus.

Operation of the temperature measurement apparatus is as follows. The oscillator 12 may be a general frequency oscillator, but it is assumed here that the oscillator 12 is a monostable multivibrator.

When the temperature measurement apparatus is made in the check mode operation by the control circuit 25, a terminal of the switch 16 is connected to the reference resistor 14 and then the oscillator 12 generates pulses, whose pulse width is principally determined by the resistor 14 and the capacitor 15 of the oscillator 12. The pulse width is also affected by the environmental temperature and power source voltage. A resistance $R_c(T)$ of the resistor 14 and a capacitance $C(T)$ of the capacitor 15 at a temperature $T$ can be generally expressed by $$R_c(T) = R_{c0}[1 + f_{Rc}(T)] \tag{1}$$

$$C(T) = C_0[1 + f_C(T)] \tag{2},$$

respectively, where $R_{c0}$ is a resistance and
$C_0$ a capacitance at a reference temperature $T_O$, and $f_{Rc}(T)$ and $f_C(T)$ are functions depending on the environmental temperature $T$ and are $O$ at $T = T_O$, respectively.

The oscillator circuit 12 is so constituted that the pulse width $t_c(T,V)$ determined by the resistor 14 and the capacitor 15 of the oscillator 12 is proportional to the product of $R_c(T)$ and $C(T)$, where $t_c(T,V) = K(T,V)R_c(T)C(T)$, $K(T,V)$ is a proportional variable, depending on the environmental temperature $T$ and the voltage $V$ of the power source. It is written as $$K(T,V) = K_0[1 + f_K(T,V)] \tag{3},$$

where $K_O$ is a constant value at the reference temperature $T_O$. Accordingly, the pulse width $t_c(T,V)$ at the arbitrary environmental temperature $T$ and the voltage $V$ of the power source is $$\begin{aligned} t_c(T,V) &= K_O R_{c0} C_0 \{1 + f_K(T,V)\} \times \\ &\quad \{1 + f_{Rc}(T)\} \cdot \{1 + f_C(T)\} \\ &= t_{c0}\{1 + f_K(T,V)\}\{1 + f_{Rc}(T)\}\{1 + f_C(T)\} \end{aligned} \tag{4},$$

where $t_{c0}$ is a pulse width at the reference environmental temperature and the reference voltage of the power source in the check mode operation.

On the other hand, a period $t_s$ of the clock generator 19 also depends on the environmental temperature and the voltage of the power source, and is expressed as $$t_s(T,V) = t_{s0}[1 + f_{Ks}(T,V)][1 + f_{Rs}(T)][1 + f_{Cs}(T)] \tag{5},$$

where:

$t_{s0}$ is a reference period of the clock generator 19 at the reference environmental temperature $T_O$ and the reference voltage $V_O$ of the power source, $t_s$ is the period of the clock generator 19 at an arbitrary environmental temperature T and a voltage V of the power source, $f_{Ks}(T,V)$ corresponds to the variation of the proportional variable at the environmental temperature T and the voltage V of the power source, and $f_{Rs}(T)$ and $f_{Cs}(T)$ are variations of a resistor and a capacitor, which determine the period of the clock generator 19, respectively.

In the check mode operation, the pulse width $t_c(T,V)$ of the oscillator 12 is counted by the counter 20 taking the period $t_s$ of the clock generator 19 as a reference cycle. Then, a counting value $Nc(T,V)$ at an arbitrary environmental temperature T and a voltage V is given by the following:

$$Nc(T,V) = \frac{t_c(T,V)}{t_s(T,V)} = \qquad (6)$$

$$\frac{t_{cO}\{1+f_K(T,V)\}\{1+f_{Rc}(T)\}\{1+f_c(T)\}}{t_{sO}\{1+f_{Ks}(T,V)\}\{1+f_{Rs}(T)\}\{1+f_{Cs}(T)\}}$$

$$= Nc_O \times \frac{\{1+f_K(T,V)\}\{1+f_{Rc}(T)\}\{1+f_c(T)\}}{\{1+f_{Ks}(T,V)\}\{1+f_{Rs}(T)\}\{1+f_{Cs}(T)\}}$$

$$= Nc_O \cdot K_V(T,V),$$

where $Nc_O$ is a value counted at the reference environmental temperature $T_O$ and the reference voltage $V_O$ of the power source, and coefficient $K_V(T,V)$ is a function representing variation of the counted value at an arbitrary environmental temperature T and an arbitrary voltage V.

The counted value $N_c(T,V)$ is transferred to the memory 21 by the control circuit 25 and stored therein. After the counted value $N_c(T,V)$ is stored in the memory 21, the temperature measurement apparatus is set to the measurement mode operation by the control circuit 25, and then the terminal of the switch 16 is changed over from the reference resistor 14 to the temperature sensitive device 13 by actuation of the switch control circuit 18.

The temperature of the temperature sensitive device 13 is subject to the temperature at a measurement place, and therefore, $t_m(T,V)$ of the oscillator 12 becomes the one corresponding to the measurement temperature taking into account variation effects due to the environmental temperature and the power source voltage different from the reference environmental temperature $T_O$ and the reference power source voltage $V_O$, respectively.

The pulse width $t_m(T,V)$ of the pulses of the oscillator 12 in the measurement mode operation is expressed likewise by $$t_m(T,V) = K(T,V) \cdot Rm(T) \cdot C(T) \qquad (7),$$

where $Rm(T)$ is a temperature dependent resistance of the temperature sensitive device 13, $C(T)$ is the temperature dependent capacitance of the capacitor 15 and $K(T,V)$ is the proportional variable.

Latter two values $C(T)$ and $K(T,V)$ are same as the ones in the check mode operation, since two mode operations are only different in that the reference resistor 14 is substituted for the temperature sensitive device 13. Therefore, we obtain $$t_m(T,V) = \qquad (8),$$

-continued
$$K_O \cdot Rm_O \cdot C_O\{1+f_K(T,V)\}\{1+f_{Rm}(T')\}\{1+f_c(T)\}$$
$$= t_{mO}\{1+f_K(T,V)\}\{1+f_{Rm}(T')\}\{1+f_c(T)\}$$

where $Rm = Rm_O[1+f_{Rm}(T')]$, T' is the temperature the desired measurement place, $t_{mO}$ is a pulse width for the measurement mode operation at the reference environmental temperature $T_O$ and the reference voltage $V_O$ of the power source.

When the pulse width $t_m(T,V)$ of the oscillator 12 in the measurement mode operation is counted by the counter 20 with respect to the period $t_s(T,V)$ of the reference pulses from the clock generator 19 giving rise to a counted value $Nm(T,V)$ $$Nm(T,V) = \frac{t_m(T,V)}{t_s(T,V)} = \qquad (9),$$

$$\frac{t_{mO}\{1+f_K(T,V)\}\{1+f_{Rm}(T')\}\{1+f_c(T)\}}{t_{sO}\{1+f_{Ks}(T,V)\}\{1+f_{Rs}(T)\}\{1+f_{Cs}(T)\}}$$

$$= Nm_O \cdot \frac{\{1+f_K(T,V)\}\{1+f_{Rm}(T')\}\{1+f_c(T)\}}{\{1+f_{Ks}(T,V)\}\{1+f_{Rs}(T)\}\{1+f_{Cs}(T)\}}$$

where $Nm_O$ is a counted value for the measurement mode operation at the reference environmental temperature $T_O$ and the reference voltage $V_O$ of the power source. That means $Nm_O$ is the counted value converting Nm for the value at the reference environmental temperature $T_O$ and the reference voltage $V_O$.

The equation (9) is rewritten by using the equation (6) for Nc in the check mode operation as $$Nm_O = Nm \cdot \frac{Nc_O}{Nc} \cdot \frac{1+f_{Rc}(T)}{1+f_{Rm}(T')} \qquad (10),$$

where

Nc is the counted value for the check mode state and is stored in the memory 21, Nm is the counted value for the measurement mode operation and is stored in the counter 20, and $Nc_O$ is counted at the reference environmental temperature (e.g. at 20° C.) and the reference voltage (the counting for $Nc_O$ is made as one process step for the adjustment of a completed apparatus), and $f_{Rm}(T')$ is the function corresponding to temperature dependency of the temperature sensitive device 13 and becomes available once the kind and characteristics of the temperature sensitive device 13 are determined.

If we assume that the temperature coefficient of the reference resistor 14 is zero in the check mode operation, the function $f_{Rc}$ is zero, and therefore the equation (10) becomes $$Nm_O = Nm \cdot \frac{Nc_O}{Nc} \cdot \frac{1}{1+f_{Rm}(T')} \qquad (11)$$

The equation (11) represents that the counted value Nm counted in the temperature measurement at an arbitrary environmental temperature T and a voltage V of the power source is converted into the counted value $Nm_O$ which is equivalent to a value counted at the reference temperature $T_O$ and the reference voltage $V_O$ of the power source.

This arithmetic compensation for calibration is done by the calibration circuit 22 by using the stored values $Nc_O$ and Nc. This calibration provides a possibility for the temperature measurement, which can afford a measurement quite free from the effect of variation of the environmental temperature and the voltage of the power source to the electric circuits of the measurement apparatus. The calibrated counting value is converted by the conversion circuit 23 into a value scaled in temperature and is displayed or recorded by the apparatus 24.

The temperature measurement by the temperature measurement apparatus in accordance with the present invention gives accurate results, since the measured value is indicated after the calibration and therefore is independent of the fact that the pulses from the oscillator 12 and the clock generator 19 are liable to be affected by the environmental temperature and the voltage of the power source. Besides, it is not necessary to use expensive circuit elements of especially small temperature coefficient. For example, sufficiently successful measurement accuracy is obtainable without using a crystal oscillator for the clock generator 19.

In the present temperature measurement apparatus, the only effect of the environmental temperature variation arises from the temperature dependency of the reference resistor 14 for use in the check mode operation. The effect of the environmental temperature variation is in principle determined by the temperature coefficient of the reference resistor 14. In other words, only by utilizing a reference resistor of a small temperature coefficient, such an accurate measurement is obtainable that accuracy of the measurement falls within a range of errors determined by the variation of the temperature coefficient of the reference resistor 14.

In this respect, the present invention has a merit over the conventional apparatus, where accuracy is affected by temperature dependency of more than two circuit elements and of an oscillation circuit. The temperature dependency of the reference resistor 14 of the present invention has almost nothing to do with the voltage variation of the power source. This is a distinctive advantage comparing to the conventional temperature measurement apparatus. This reflects to a more favourable merit, when the voltage varies relatively slowly with respect to the change-over cycle (several 10 msec.) between the check mode operation and measurement mode operation. This is like the case where batteries are used for the power source and the voltage variation gradually occurs as the batteries are discharging. Accordingly, when the batteries are used for the voltage source of the temperature measurement apparatus in accordance with the present invention, it is not at all necessary to stabilize the voltage source, and a high voltage or an additional power necessary for the stabilization can be saved. For example, when a battery source of 5-10 V is used, it is possible to reduce it by about 20%. In addition, life time of the battery source is greatly prolonged owing to small power consumption for driving the temperature measurement apparatus.

FIG. 4 shows another embodiment of the present invention. A temperature measurement apparatus of FIG. 4 comprises a temperature sensitive device 26 such as a thermistor or a temperature measurement resistor, a reference resistor 27 having a small temperature coefficient, a power source 28 to supply a current to the device 26 and the resistor 27 in series, a switch 29 to change over electrical connection between the temperature sensitive device 26 and the reference resistor 27, a switch control circuit 30 to control the switch 29, an amplifier 31, a memory 32, a calibration circuit 33, a conversion circuit 34, a display apparatus 35 and a control circuit 36.

The temperature measurement apparatus of FIG. 4, especially of the parts other than the amplifier 31, the device 26, the resistor 27, the power source 28 and the switch 29 is similar to FIG. 3. The parts of FIG. 4 are automatically controlled by the control circuit 36, like by the control circuit 25 in FIG. 3. The operation of the temperature measurement apparatus of FIG. 4 is elucidated as follows.

When the temperature measurement apparatus is made in a check mode operation, a terminal of the switch 29 is connected to the resistor 27. The current is fed from the power source 28 to a series connection circuit consisting of the temperature sensitive device 26 and the resistor 27 thereby producing a voltage across both terminals of the resistor 27. Accordingly, an output voltage of the amplifier 31 is proportional to the voltage across both terminals of the resistor 27 and is subject to effect of variations of an environmental temperature and a power source voltage.

The current I fed from the power source 28 to the resistor 27 and a resistance Rc of the resistor 27 can be expressed as follows by taking into account the effect of the variations of the environmental temperature T and the power source voltage V:

$$I(T,V) = I_0[1 + f_I(T,V)] \quad (12),$$

$$Rc(T) = Rc_0[1 + f_{Rc}(T)] \quad (13),$$

where $f_I(T,V)$ and $f_{Rc}(T)$ are functions representing variations of the resistance Rc(T) and the current I(T,V) caused by the environmental temperature T and the voltage V of the power source 28, respectively, both functions becoming zero at a reference temperature $T_O$ and a reference voltage $V_O$ of the power source.

The voltage $E_R$ across both terminals of the resistor 27 is given by $$E_R = Rc \cdot I = Rc_0 \cdot I_0[1 + f_{Rc}(T)][1 + f_I(T,V)] \quad (14).$$

An amplification degree G(T,V) of the amplifier 31 also depends on the effect of the variations of the environmental temperature T and the power source voltage V and can be expressed likewise:

$$G(T,V) = G_0[1 + f_G(T,V)] \quad (15),$$

where $f_G(T,V)$ is a function representing variations of the amplification degree G(T,V) caused by T and V and becomes zero at $T = T_O$ and $V = V_O$.

An output voltage Ec(T,V) of the amplifier 31 is given by $$\begin{aligned} Ec(T,V) &= Rc \cdot I \cdot G \\ &= Rc_0 \cdot I_0 \cdot G_0\{1 + f_{Rc}(T)\}\{1 + f_I(T,V)\}\{1 + f_G(T,V)\} \\ &= Ec_0\{1 + f_{Rc}(T)\}\{1 + f_I(T,V)\}\{1 + f_G(T,V)\} \end{aligned} \quad (16),$$

where $Ec_O$ is an output voltage of the amplifier 31 for the reference environmental temperature $T_O$ and the reference power source voltage $V_O$ in the check mode operation. The output voltage Ec(T,V) of the amplifier 31 is transferred to be put into the memory 32 for memorization under control by the control circuit 36 and stored therein.

After the memorizing of the output voltage Ec(T,V) of the amplifier 31 in the memory 32, the temperature measurement apparatus is shifted into a measurement mode operation by the control circuit 36. The switch control circuit 30 is actuated and the terminal of the switch 29 is connected to the temperature sensitive device 26. The temperature sensitive device 26 is subject to a temperature to be measured, and a voltage across both terminals of the temperature sensitive device 26 is responding to the measurement temperature. But the output voltage Ec(T,V) of the amplifier 31 generally deviates from the one at the reference temperature $T_O$ and the reference voltage $V_O$.

A resistance Rm(T) of the temperature sensitive device 26 varies with the temperature T' to be measured and can be expressed as $$Rm(T') = Rm_O[1 + f_{Rm}(T')] \quad (17)$$

The output voltage Em(T,V) of the amplifier at the measurement mode is $$Em(T,V) = Rm \cdot I \cdot G$$

$$= Rm_O \cdot I_O \cdot G_O[1 + f_{Rm}(T')][1 + f_I(T)][1 + f_G(T,V)]$$

$$= Em_O[1 + f_{Rm}(T')][1 + f_I(T)][1 + f_G(T,V)] \quad (18),$$

where $Em_O$ is the output voltage of the amplifier 31 at the reference temprature $T_O$ and the reference power source voltage $V_O$ in the measurement mode state.

From the two equations (16) and (18), we obtain $$Em_O = Em(T,V) \cdot \frac{Ec_O}{Ec(T,V)} \cdot \frac{1 + f_{Rc}(T)}{1 + f_{Rm}(T')} \quad (19).$$

Ec(T,V) is the output voltage of the amplifier 31 in the check mode operation and its value is stored in the memory 32. Em(T,V) is the output voltage of the amplifier 31 in the measurement mode operation.

$Ec_O$ is counted at the reference environmental temperature and the reference voltage. The counting for $Ec_O$ is made as one process step for the adjustment of a completed temperature measurement apparatus, and the counted value is stored in the memory 32. $f_{Rm}(T')$ is the function corresponding to temperature dependency of the temperature sensitive device 26 and becomes available once the kind and characteristics of the temperature sensitive device 26 are determined.

If we assume that the temperature coefficient of the reference resistor 27 is zero in the check mode operation, the function $f_{Rs}(T)$ is zero, and therefore the equation (19) becomes $$Em_O = Em \cdot \frac{Ec_O}{Ec} \cdot \frac{1}{1 + f_{Rm}(T')} \quad (20)$$

The equation (20) represents that the counted value Em counted in the temperature measurement at an arbitrary environmental temperature T and a voltage V of the power source is converted into the counted value $Em_O$ which is equivalent to a value counted at the reference temperature $T_O$ and the reference voltage $V_O$ of the power source.

This arithmetic compensation for calibration is done by the calibration circuit 33 by using the stored values $Ec_O$ and Ec. This calibration provides a possibility for the temperature measurement, which can afford a measurement quite free from the effect of the variation of the environmental temperature and the voltage of the power source to the electric circuits of the temperature measurement apparatus. The calibrated counting value is converted by the conversion circuit 34 into a value scaled in temprature and is displayed or recorded by the apparatus 35.

For the temperature measurement apparatus in accordance with the present invention, it is not necessary for a circuit configuration and circuit elements to make their temperature dependency extremely small. This is a merit over the conventional bridge-type temperature measurement apparatus, where measurement accuracy is affected by temperature dependency and voltage variation on three resistors except a temperature sensitive device in a bridge circuit, and by those variations received by an amplifier circuit. Therefore, if we wish to improve the temperature measurement accuracy in the conventional temperature measurement apparatus, it costs much to make that the temperature coefficients of the three resistors are small, thermal drift of the amplifier circuit is also small and that the power voltage is a stabilized one.

According to the present invention, it is not necessary to employ an amplifier of small thermal drift and a stabilized power source, thereby reducing the production costs, since the temperature measurement errors due to variations of the environmental temperature and the power source voltage can be removed by the arithmetic calibration.

What is claimed is:

1. A temperature measurement apparatus comprising:
   a temperature sensitive device;
   an electric circuit for producing output signals responding to electrical states of said temperature sensitive device;
   a reference resistor of a known temperature coefficient which is connected in said electric circuit to produce a reference output signal at a predetermined reference environmental temperature and at a reference voltage of a power source;
   a memory for memorizing said reference output signal;
   a control circuit for alternatively switching to produce output signals for said temperature sensitive device and for said reference resistor; and
   a calibration circuit for calibrating a measurement error due to variation from said environmental temperature and a power source voltage by use of said memorized reference output signal and said output signals for said temperature sensitive device and said reference resistor,
   said calibration circuit for performing an arithmetic calculation $$Vm \cdot \frac{Vc_0}{Vc} \cdot \frac{1}{1 + f(T)}$$

where $Vc_O$ is said reference output signal, Vc and Vm are said output signals for said reference resistor and said temperature sensitive device, respectively, and 1+f(T) represents a function representing thermal characteristics of said temperature sensitive device at a temperature T normalized with respect to said reference temperature.

2. A temperature measurement apparatus according to claim 1 wherein said reference resistor, said temperature sensitive device and a power source are connected in series, and wherein the apparatus further includes an amplifier for amplifying a voltage across said reference resistor or said temperature sensitive device taken out through a change-over switch which interchangingly connects an input terminal of said amplifier to respective ends of said reference resistor and said temperature sensitive device.

3. A temperature measurement apparatus according to claim 2 wherein said control circuit is for transferring an output signal of said amplifier by said reference resistor to said memory, and following the transferring said control circuit is for switching over an electrical connection of said amplifier from said reference resistor to said temperature sensitive device.

* * * * *